United States Patent Office 3,442,753
Patented May 6, 1969

3,442,753
PULPING OR LIGNO-CELLULOSIC MATERIAL WITH A REACTION PRODUCT OF TRIETHYLENEGLYCOL AND ORGANIC ACID
Leonard F. Burkart, Nacogdoches, Tex., assignor, by mesne assignments, to Norman Quigley, State Line, Nev.
No Drawing. Filed Oct. 20, 1965, Ser. No. 499,001
Int. Cl. D21c 3/20; C07d 5/22
U.S. Cl. 162—76                  10 Claims

ABSTRACT OF THE DISCLOSURE

A liquor for and a method of treating ligno-cellulosic materials for removal of lignin and other non-carbohydrates as well as non-cellulosic carbohydrates from cellulosic matter. The liquor is a reaction product obtained by mixing triethyleneglycol with an organic acid. The method of treating the ligno-cellulosic material includes subjecting such material to the digesting and extracting action of the liquor followed by separation of the rich liquor from the treated cellulosic matter.

The present invention relates to treatment of ligneous vegetable matter and more particularly to a method of and a liquor for removing non-cellulosic carbohydrate and non-carbohydrate materials from lignified plant matter and converting residual carbohydrate fractions into commercially useful products.

It would be highly advantageous to derive useful products such as furfural compounds from ligneous carbohydrate materials occurring naturally in abundance. It would also be highly advantageous to derive lignin from the same material both economically and expediently as well as converting cellulosic materials of such matter when desired into pulp useful in the paper-making industry. The present invention is specifically directed to accomplishing such results by the provision of a liquor which solubilizes and extractively delignifies ligneous vegetable matter.

It is therefore an object of the present invention to provide a liquor or solvent attaining the foregoing advantages with surprising decrease of treatment time for pulping and delignifying plant materials as well as effectively converting carbohydrate fractions of such material into furfural compounds or other organic compounds of possible economic use.

A further object of the present invention is to provide an improved process for the removal of lignin and non-cellulosic carbohydrate from ligno-cellulosic materials at relatively low temperatures and atmospheric pressure, the lignin so removed being readily recoverable in a form with desirable properties for the manufacture of adhesives, binders, plastics, and extenders for such and similar materials, the non-cellulosic carbohydrates also being readily recoverable in a form with desirable properties for manufacture into furfural and for other industrial chemical uses.

Another object of the invention is to provide a process whereby residual carbohydrate fractions of ligneous vegetable matter can be converted into furfural compounds and other organic materials of value.

A still further object of the present invention is to provide a process whereby cellulosic materials of ligneous vegetable matter can be reduced to pulp and recovered for further use.

Still another object of the present invention is the provision of a unique liquor or solvent system which serves to accomplish the foregoing objectives by chemical reaction and combination with ligneous vegetable matter.

Other and further objects, features and advantages will be apparent from the following description of the invention given for the purpose of disclosure.

The present invention generally provides a liquor or solvent for an a method of removing non-carbohydrate materials commonly known as ligin from comminuted wood, wood residues, and other lignified plant materials and converting residual non-cellulosic carbohydrate fractions known as hemi-celluloses into furfural compounds and other organic materials. In addition, the present invention provides a unique method for recovering lignin as well as cellulosic materials.

A highly desirable liquor for treating ligneous vegetable matter may be obtained by reacting triethyleneglycol with a small amount of organic acid such as phenolsulfonic acid or paratoluenesulfonic acid. The resulting reaction mixture, which contains both aliphatic and aromatic compounds such as aldehydes, ketones, alcohols, acids, esters, saturated and unsaturated hydrocarbons in varying amounts possesses unique solvent properties for the non-cellulosic carbohydrate and non-carbohydrate fraction of lignocellulosic materials. Under different conditions of temperature, such reaction mixture or liquor possesses the ability to dissolve the carbohydrate fractions by progressive degradation of the cellulose and remaining hemicellulose constituents.

When ligneous vegetable matter is heated initially with the liquor, non-carbohydrate material is dissolved and may be removed by draining or centrifugation. The non-carbohydrate fraction is precipitated from the rich liquor by addition of water. The resulting precipitate is lignin material which may be recovered by filtration, washed with fresh water and dried at temperatures below 100° C. to prevent self-polymerization.

At this point, the residual carbohydrate material from which the lignin-rich liquor was separated may be washed for example with warm water and dried by suitable methods to provide a high quality wood pulp.

In the alternative, the residual carbohydrate material may be further processed by dissolving in fresh liquor at elevated temperatures until substantially all of it goes into solution. Furfural, 5-hydroxymethylfurfurral and other organic materials may be separated from such solution by steam distillation or other suitable means known in the art.

It will be recognized that spent liquor from any of the above steps may be reconcentrated by evaporation of water at reduced pressure and reused in the process with freshly prepared liquor.

EXAMPLE 1

Triethyleneglycol was mixed and reacted with approximately 0.5 percent by total weight of solution of phenolsulfonic acid by heating the mixture to a temperature of about 125° C. to about 135° C. and maintaining the mixture at said temperature for about one hour. The resultant reaction mixture was then used as a liquor as will be described. Essentially dry wood sawdust was placed in a closed reaction vessel and covered with the liquor. Temperature of the liquor-sawdust mixture was raised to about 125° C. to about 135° C. and maintained at this temperature for 30 to 60 minutes under mild agitation. The reaction vessel was equipped with a condensor to condense volatile materials driven off as digestion proceeded. Then the liquor was filtered from the disintegrated wood fibers and was diluted with two to two and one-half volumes of clean water to precipitate out substantially all of the dissolved non-carbohydrate or lignin material therein. Such lignin material was then filtered and washed with fresh water and dried at temperatures below 100° C. At this point, the residual wood fraction was suitable for further use as a wood pulp. However, fresh liquor was added to the residual wood or carbohydrate fraction and the temperature was raised to the range of about 160° C. to about 180° C. and maintained at that level for 1.5 to 2 hours to dissolve substantially all of such material except for humic residue. The resulting furfurals and other organic compounds in the glycol liquor were then recovered.

EXAMPLE 2

Triethyleneglycol was reacted with approximately 0.5 percent by total weight of solution of paratoluenesulfonic acid for one hour by heating to about 125° C. to about 135° C. Essentially dry wood sawdust was placed in a closed reaction vessel as above and covered with the liquor solution and maintained for 30 to 60 minutes at a temperature of about 125° C. to about 135° C. under mild agitation. Then the liquor containing extracted lignin was drained and separated from the residue of soft disintegrated wood fibers. The wood fiber residue was suitable for use as a high quality pulp for use in paper products. However, fresh liquor was added to such wood residue to cover it and the temperature was raised to about 160° to about 180° C. and maintained at that level for 1.5 to 2 hours to dissolve substantially all of the wood material except for a humic residue. The resulting furfurals and other organic compounds in the glycol liquor were then recovered. The lignin-rich liquor first separated from the wood residue was diluted with two to two and one-half volumes of clean water whereupon the dissolved lignin precipitated and was recovered by filtration, washed with fresh water and dried at temperatures below 100° C.

In further practices of the present invention, it was determined that the liquors of both examples provided comparable results by initially reacting the triethyleneglycol and about 0.5 percent by total weight of solution of phenolsulfonic or paratoluenesulfonic acids at ambient temperature for about 24 to 48 hours rather than by heating to about 125° C. to 135° C. for one hour. Also, it was found that the 0.5 percent concentration of acid in the liquor is not critical although concentration has a direct relation to effectiveness of delignification of the cellulosic material. Slightly smaller or larger amounts of acid may be advantageously used.

Thus provided by the present invention is a liquor for and a method of delignifying wood or other ligneous vegetable matter as well as effectively pulping or digesting such matter and deriving valuable organic compounds therefrom.

The present invention, therefore, is well adapted to carry out the objects and attain the ends and advantages mentioned as well as others inherent therein. The composition and process may be resorted to without departing from the spirit and scope of the invention as hereinafter claimed.

What is claimed is:
1. A liquor for pulping, solubilizing and delignifying cellulosic material being a reaction product obtained by mixing triethyleneglycol with at least approximately 0.5 percent by total weight of an organic acid selected from the group consisting of phenolsulfonic acid and paratoluenesulfonic acid, and maintaining the mixture at ambient temperature for about 24 hours.

2. A liquor for pulping, solubilizing and delignifying cellulosic material being a reaction product obtained by mixing triethyleneglycol with about 0.5 percent organic acid selected from the group consisting of phenolsulfonic acid and paratoluenesulfonic acid, and maintaining the mixture at ambient temperature for about 24 hours.

3. A liquor for pulping, solubilizing and delignifying cellulosic material being a reaction product obtained by mixing triethyleneglycol with about 0.5 percent organic acid selected from the group consisting of phenolsulfonic acid and paratoluenesulfonic acid, heating said mixture to a temperature of about 125° C. to 135° C., and maintaining the mixture at said temperature for about one hour.

4. The method of treating ligneous vegetable matter to effect removal of non-cellulosic material therefrom which comprises subjecting said matter to the digesting and extracting action of a liquor for about 30 to 60 minutes at about 125° C. to about 135° C., said liquor being a reaction product obtained by mixing triethyleneglycol with at least approximately 0.5 percent by total weight of an organic acid selected from the group consisting of phenolsulfonic acid and paratoluenesulfonic acid and maintaining the mixture at ambient temperature for about 24 hours.

5. The method of treating ligneous vegetable matter to effect removal of non-cellulosic material therefrom which comprises,
   subjecting said matter to the digesting and extracting action of a liquor for about 30 to 60 minutes at about 125° C. to about 135° C.,
   said liquor being a reaction product obtained by mixing triethyleneglycol with about 0.5 percent organic acid selected from the group consisting of phenolsulfonic acid and paratoluenesulfonic acid, and maintaining the mixture at ambient temperature for about 24 hours.

6. The method of treating ligneous vegetable matter to effect removal of non-cellulosic material therefrom which comprises,
   subjecting said matter to the digesting and extracting action of a liquor for about 30 to 60 minutes at a temperature of about 125° C. to about 135° C.,
   said liquor being a reaction product obtained by mixing triethyleneglycol with about 0.5 percent organic acid selected from the group consisting of phenolsulfonic acid and paratoluenesulfonic acid, heating said mixture to a temperature of about 125° C. to 135° C., and maintaining the mixture at this temperature for about one hour.

7. The method of claim 6 wherein additionally the treated ligneous vegetable matter is separated from the liquor and is washed and dried.

8. The method of deriving lignin from ligneous vegetable mater which comprises,
   subjecting said matter to the digesting and extracting action of a liquor for about 30 to 60 minutes at about 125° C. to about 135° C. to extract ligin from said matter,
   said liquor being a reaction product obtained by mixing triethylenelgylcol with at least approximately 0.5 percent by total weight of an organic acid selected from the group consisting of phenolsulfonic acid and paratoluenesulfonic acid, and maintaining the mixture at ambient temperature for about 24 hours,
   separating the extraction liquor containing the lignin from said matter to provide a lignin-rich liquor,
   adding about one to two and one-half volumes of water to said lignin-rich liquor to precipitate the lignin, and
   filtering, washing, and drying said lignin.

9. The method of deriving lignin from ligneous vegetable matter which comprises,
   subjecting said matter to the digesting and extracting action of a liquor for about 30 to 60 minutes at about 125° C. to about 135° C. to extract lignin from said matter,
   said liquor being a reaction product obtained by mixing triethyleneglycol with at least approximately 0.5 percent by total weight of an organic acid selected from the group consisting of phenolsulfonic acid and paratoluenesulfonic acid, heating said mixture to a temperature of about 125° C. to 135° C., and maintaining the mixture at said temperature for about one hour,
   separating the extraction liquor containing the lignin from said matter to provide a lignin-rich liquor.

adding about one to two and one-half volumes of water to said lignin-rich liquor to precipitate the lignin, and filtering, washing, and drying said lignin.

10. The method of deriving lignin from ligneous vegetable matter which comprises, subjecting said matter to the digesting and extracting action of a liquor for about 30 to 60 minutes at about 125° C. to about 135° C. to extract lignin from said matter, said liquor being a reaction product obtained by mixing triethyleneglycol with about 0.5 percent organic acid selected from the group consisting of phenolsulfonic acid and paratoluenesulfonic acid, heating said mixture to a temperature of about 125° C. to 135° C., and maintaining the mixture at said temperature for about one hour, separating the extraction liquor containing the lignin from said matter to provide a lignin-rich liquor, adding about one to two and one-half volumes of water to said lignin-rich liquor to precipitate the lignin, and filtering, washing, and drying said lignin.

References Cited

UNITED STATES PATENTS

| 2,308,564 | 1/1943 | McKee | 162—76 X |
| 2,703,279 | 3/1955 | Bate | 162—76 |
| 2,772,968 | 12/1956 | Grondal | 162—16 X |

S. LEON BASHORE, *Primary Examiner.*

U.S. Cl. X.R.

162—77; 260—124, 347.9, 456

UNITED STATES PATENT OFFICE
CERTIFICATE OF CORRECTION

Patent No. 3,442,753                             May 6, 1969

Leonard F. Burkart

It is certified that error appears in the above identified patent and that said Letters Patent are hereby corrected as shown below:

In the heading to the printed specification, line 2, "OR" should read -- OF --. Column 2, line 5, "an" should read -- and --; line 6, "ligin" should read -- lignin --.

Signed and sealed this 28th day of April 1970.

(SEAL)
Attest:

Edward M. Fletcher, Jr.                      WILLIAM E. SCHUYLER, JR.
Attesting Officer                               Commissioner of Patents